United States Patent
Abel

(10) Patent No.: US 7,140,630 B2
(45) Date of Patent: Nov. 28, 2006

(54) TRAILER ADAPTER HITCH FOR A BARROW

(76) Inventor: Gary V. Abel, 3882 Whitebrook La., Ellicott City, MD (US) 21042

( * ) Notice: Subject to any disclaimer, the term of this patent is extended or adjusted under 35 U.S.C. 154(b) by 73 days.

(21) Appl. No.: 10/932,451

(22) Filed: Sep. 2, 2004

(65) Prior Publication Data

US 2005/0051995 A1    Mar. 10, 2005

Related U.S. Application Data

(60) Provisional application No. 60/500,110, filed on Sep. 4, 2003.

(51) Int. Cl.
*B62K 27/00* (2006.01)

(52) U.S. Cl. ................. 280/292; 280/288.4; 280/47.31

(58) Field of Classification Search ............ 280/43.14, 280/47.3, 47.17, 47.31, 47.32, 288.4, 292, 280/652, 653, 659, 491.5, 493–495
See application file for complete search history.

(56) References Cited

U.S. PATENT DOCUMENTS

| 3,734,536 | A | * | 5/1973 | Dever et al. | 280/204 |
| 3,778,087 | A | * | 12/1973 | Kallenbach | 280/292 |
| 4,052,079 | A | * | 10/1977 | Lehman | 280/47.2 |
| 4,155,678 | A | * | 5/1979 | Lehman et al. | 414/483 |
| 4,281,950 | A | * | 8/1981 | Lehman et al. | 410/3 |
| 5,415,421 | A | * | 5/1995 | Godwin | 280/47.31 |
| 6,203,048 | B1 | * | 3/2001 | Adair | 280/491.5 |

* cited by examiner

*Primary Examiner*—Lesley D. Morris
*Assistant Examiner*—Lee Lum
(74) *Attorney, Agent, or Firm*—Ober / Kaler; Royal W. Craig

(57) ABSTRACT

A trailer adapter hitch suitable for converting a manually operated two wheeled barrow to a two wheeled trailer for use with a motorized vehicle is the subject of the present invention. The trailer adapter hitch is generally linear in shape and is light weight, having a trailer hitch at one end for attaching to the pulling hitch of a motorized vehicle and means for attaching securely at two points on the frame of a two wheeled barrow.

12 Claims, 3 Drawing Sheets

TRAILER ADAPTER HITCH FOR A BARROW

CROSS REFERENCE TO RELATED APPLICATIONS

This application derives priority from U.S. provisional application Ser. No. 60/500,110, filed: Sep. 4, 2003, and is related to application Ser. No. 09/808,903 filed: Mar. 15, 2001 (now U.S. Pat. No. 6,715,775).

BACKGROUND OF THE INVENTION

1. Field of the Invention

The present invention relates to accessory equipment for lawn tractors and, more particularly, to an adapter designed to convert a manually operated barrow into a tow-behind trailer for use with a tractor.

2. Description of the Background

Two wheeled barrows and carts for manual pushing or pulling find many uses in residential and commercial settings. Indeed, mankind's earliest vehicles were single- and multi-wheeled barrows, and a great variety of these are used today for construction, lawn care, landscaping, etc. The predominant design of the common wheel barrow includes rearwardly extending and diverging handlebars, a single wheel positioned between the handlebars toward the front of the barrow, and two rear-mounted, vertical legs on which the barrow rests/balances when not in motion. Motion occurs when an operator, standing behind the barrow between the handlebars, lifts the handlebars and pushes/pulls the barrow. Variations on this basic design are found in U.S. Pat. No. 4,052,079 to Lehman, U.S. Pat. No. 4,789,171 to Porter, and U.S. Pat. No. 5,149,116 to Donze et al. While one advantage of this design is the ability to dump the barrow's contents forward or to either side, the fact that the operator must hold the handlebars in a raised position while walking forward/backward is problematic. When heavy loads are involved, the act of lifting and holding the legs off of the ground while moving the barrow subjects the operator to various forms of back injury.

There are alternative designs that place two wheels directly underneath the cargo receptacle or toward the back end of the barrow, with the legs up front. This way, the user need only balance the barrow instead of lifting. An operator moves (i.e. pushes/pulls) a barrow of this type by exerting downward force on the rearwardly extending handle assembly in order to raise the balancing legs off of the ground. The barrow is emptied by tilting or pivoting it forward on its legs to discharge the cargo over the front lip or leading edge. Examples of this concept are found in U.S. Pat. No. 3,888,501 to McChesney and U.S. Pat. No. 4,629,203 to Ballard. A further example is disclosed in U.S. Pat. No. 6,193,319 by Kielinski.

These "rear wheel" or "balanced fulcrum" designs have become very popular in recent years because, unlike "front-wheel" barrows, the operator does not have to lift a significant percentage of the total weight of the barrow and cargo. Again, the center of the entire barrow/cargo combination can be located almost directly over the wheels. This makes the barrow much easier to use. However, users must still push or pull the barrow up or down hills and this can be a trying affair, especially with a heavy load.

Many homeowners who use such barrows also have a garden tractor on hand for mowing their lawn. Most conventional garden tractors are easily adaptable for transporting the same type of loads. Indeed, there are a variety of tow-behind carts that are commercially available and which incorporate an integral trailer hitch for coupling to a tractor. These tow-carts are excellent for towing a heavy load up or down hills via the tractor. However, the hitch is a dedicated tractor hitch and these carts cannot be operated manually and are thus unsuitable for smaller jobs such as moving items around in a garage. Thus, given a dual need to transport cargo manually and by motorized vehicle, it was heretofore necessary to keep and maintain two separate pieces of equipment, the barrow and the tractor-towed cart.

There would be a significant consumer demand for a device to serve both purposes, and specifically for an adaptable trailer hitch which would allow the homeowner to hitch a barrow to a motorized vehicle when needed for the extra pull, effectively converting the conventional two wheeled barrow into a tow cart for hauling by a motorized vehicle such as a garden tractor and avoiding the need for a separate tractor cart.

SUMMARY OF THE INVENTION

It is an object of the present invention to provide a trailer adapter hitch which can be easily attached to a two wheeled barrow in order to convert it to a two wheeled trailer suitable for use with a motorized vehicle.

It is a further object of the invention to provide a trailer adapter hitch which is compact and generally linear in design, to be stored conveniently in a minimum of space.

It is an additional object of the invention to provide a trailer adapter hitch which is light weight and easy to maneuver.

In accordance with the above stated objects, the invention is a trailer adapter hitch for removable attachment to a manual barrow for conversion thereof into a trailer for use behind a motorized vehicle such as a garden tractor. The preferred embodiment is shown for attaching a forward-dumping two wheeled barrow to an existing garden tractor tow hitch. The present device employs a convenient two point attachment for stable and secure mounting of the device.

By way of background, the forward-dumping two wheeled barrow has an axle or axle housing extending between its wheels, plus a safety bar (to prevent crushing of the fingers) extending down from the handlebars and conveniently positioned at a vertical distance above and behind the axle. These two features are used for the two-point-attachment of the trailer adapter hitch. The present device attaches to the axle housing (or axle) and to the horizontal portion of the safety bar, and extends a stem forward toward the tractor. The stem is hitched to the tractor, thereby allowing the two-wheeled barrow to function as a trailer for a lawn tractor. Alternately, the device can be easily removed by disconnecting the two points of attachment and the barrow can again be used manually.

The trailer adapter hitch is constructed of sturdy and rigid material such as aluminum or steel. It is predominantly linear in shape, and can be easily hand-carried and stored in a minimum of space.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
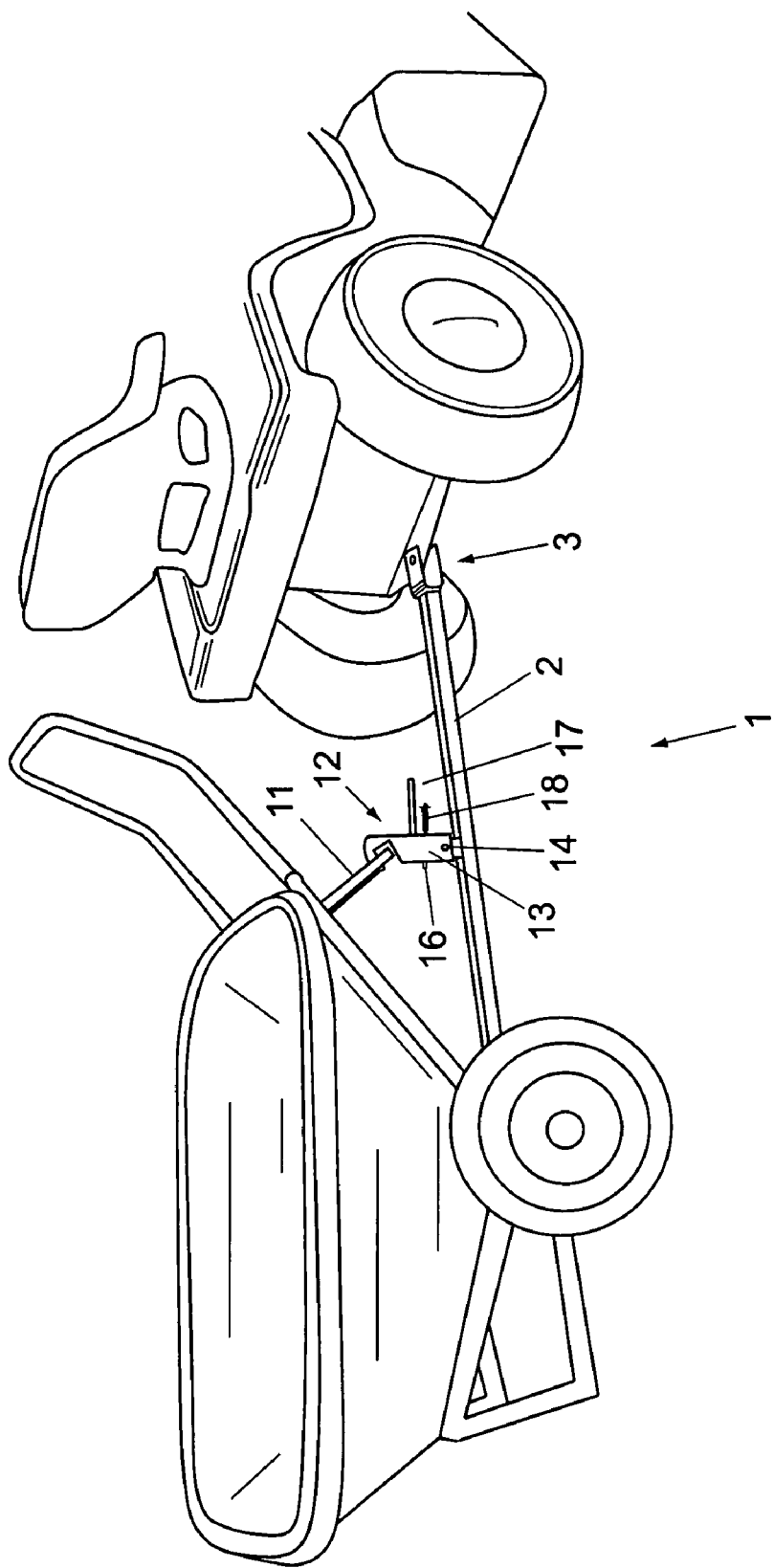
FIG. 1 is a perspective view of a trailer adapter hitch 1 according to the present invention deployed on a forward-dumping barrow for conversion thereof into a trailer for use behind a motorized garden tractor.

The present invention is a trailer adapter hitch 1 designed to convert a manually operated barrow into a tow-behind trailer for use with a tractor. FIG. 1 is a perspective view of a trailer adapter hitch 1 according to a preferred embodiment of the present invention, which is configured to couple a forward dumping barrow as described in U.S. Pat. No. 6,715,775 (the description of which is herein incorporated by reference in its entirety) to a conventional tractor. Most manual barrows have a horizontal member (obscured in FIG. 1) such as an axle, axle bearings, or an axle housing extending horizontally between the wheels, which serves as a first mounting feature. For purposes of the present invention a secondary horizontal mounting feature is required, such as a safety bracket 11 (such as disclosed in the referenced '775 patent and as shown in FIG. 1) that is essentially a U-shaped bar extending downward from the handle to a cross-member that is spaced somewhat behind the axle. Other barrows may have horizontal struts extending between the support legs, or protruding down from the cargo well, which are equally well-suited. In any case two pre-existing structural features of the barrow are used to provide a two-point mounting for the present adapter hitch assembly 1.

Figure 2:
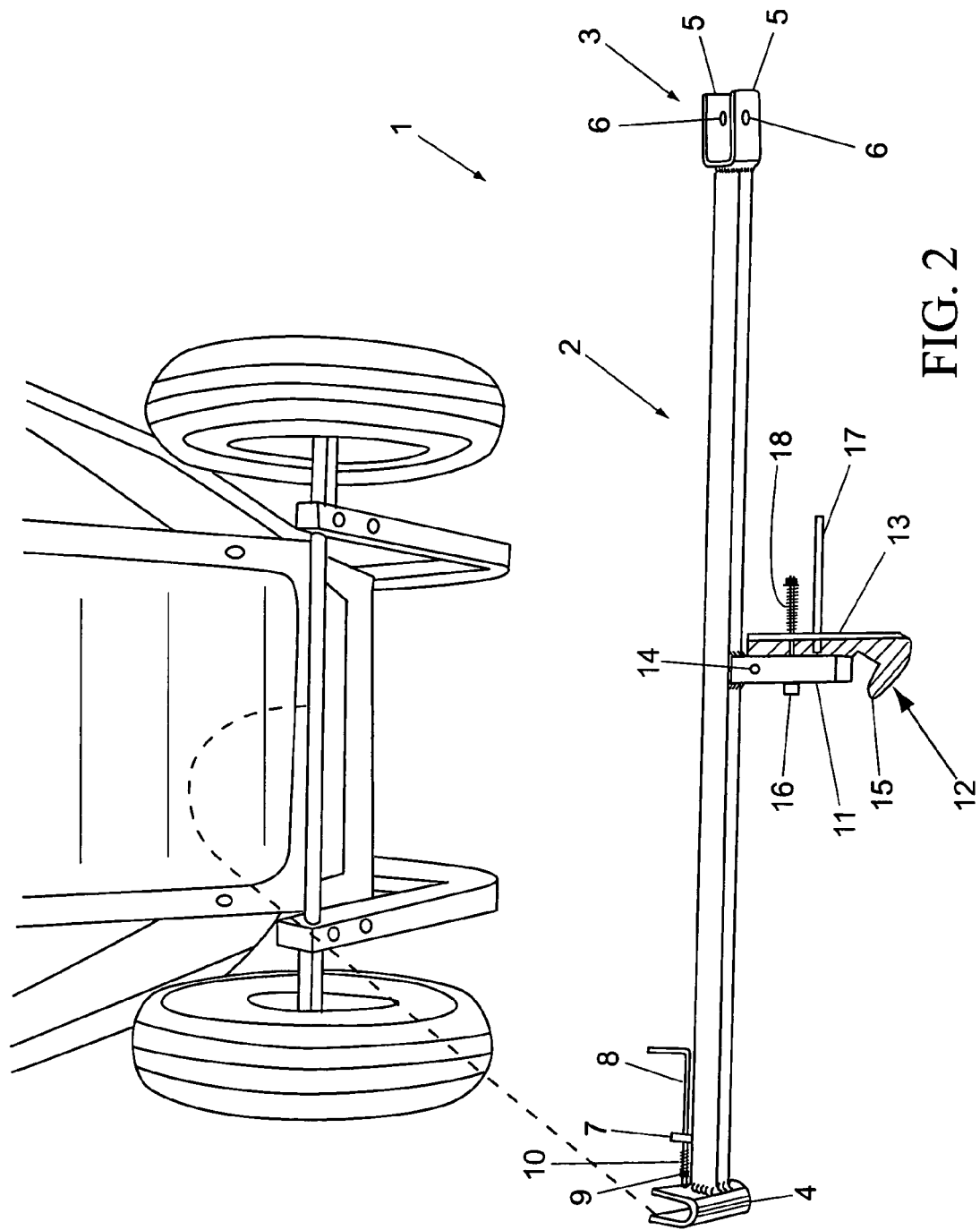
FIG. 2 is a side perspective view of the trailer adapter hitch 1 as in FIG. 1 (shown inverted) with forward-dumping barrow shown overhead.

FIG. 2 is a side perspective view of the trailer adapter hitch 1 as in FIG. 1 (shown upside down with respect to the barrow overhead). The trailer adapter hitch 1 generally comprises an elongated rigid strut 2 having a trailer hitch 3 at the forward end (such as a horizontal yoke as illustrated) and a transverse yoke 4 at the other end. The forward trailer hitch 3 here comprises yoke-extension formed by bending a section of metal into a U-shaped cross-section with two horizontal parallel plates 5, the forward trailer hitch 3 being affixed by weldment, bolts, or the like to the rigid strut 2. Parallel plates 5 are spaced apart vertically and open at the front to straddle the hitch plate of a standard lawn tractor. The horizontal plates 5 each having an aligned hole 6 to orient with the hole in the tractor's hitch plate and to allow securement via a hitch pin passed through the horizontal plates 5 and tractor hitch plate, thereby retaining the trailer hitch 3 on the tractor. One skilled in the art will appreciate that a variety of non-standard hitch plates or couplings can be found on tractors and other motorized vehicles and the trailer hitch 3 can easily be modified to hitch to any such vehicles, such modifications being considered within the scope and spirit of the invention.

The transverse yoke 4 at the other end of strut 2 likewise has a U-shaped cross-section, and the end of the rigid strut 2 is attached to the transverse yoke 4 by a weldment, bolts, or the like. The illustrated transverse yoke 4 opens downwardly when attached (here being shown inverted), but may alternatively be open upwardly.

Figure 3:
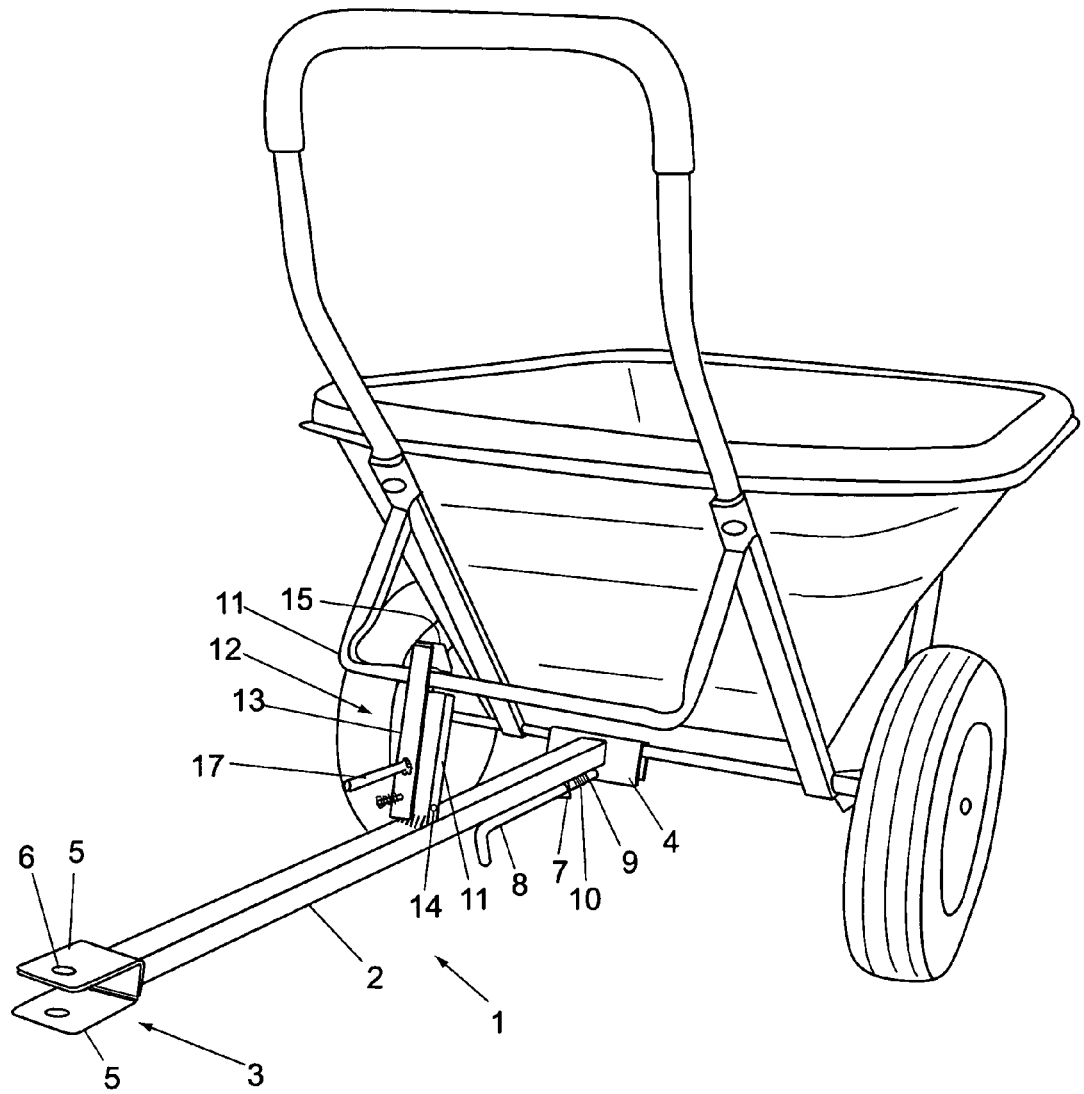
FIG. 3 is a front perspective view of the trailer adapter hitch 1 shown fully attached to the two wheeled barrow.

As best seen in FIG. 3, the open trough of the U-shaped transverse yoke 4 slips over the barrow axle (or barrow axle housing as the case may be). The transverse yoke 4 is equipped with a locking mechanism to retain it on the barrow axle. An exemplary locking mechanism as shown in FIG. 2 comprises a detent rod 8 slidably mounted in a generally square plate 7 that is bolted or welded to the bottom of the rigid strut 2, near the transverse yoke 4. A hole is formed in the plate 7 and in the extending portions of the transverse yoke 4, with the holes being placed in alignment. The detent rod 8 is positioned in the three holes so that a forward length of the rod 8 spans the downward facing opening of the transverse yoke 4. The rearward portion of the detent rod 8 extends from the transverse yoke 4 through the hole in plate 7 and continues for some distance beyond the plate 7, as shown in FIG. 2. The first rod 8 is preferably formed with an integral collar 9 positioned between the transverse yoke 4 and the plate 7 to serve as a stop member, and is bent outward at the other end to provide a hand grip. A compression spring 10 is disposed around the first rod 8 behind the collar 9 and abuts the plate 7 to maintain the detent rod 8 in its locked position. The rod 6 is selectively urged across the opening of the transverse yoke 4 and/or manually drawn back (against the bias of a spring 10) to unblock the transverse yoke 4, thereby allowing insertion onto the axle of the barrow. When released the locking mechanism retains the axle within the transverse yoke 4 as shown in FIG. 1. Other embodiments of the invention are contemplated wherein any other suitable locking mechanism may be provided to retain transverse yoke 4 on the barrow axle.

As shown in FIG. 3, the rigid strut 2 is equipped with a post 11 affixed by welding or bolting to its top surface, at a point selected so that the post 11 will extend upward toward the second horizontal member (e.g., safety bracket) of the two-wheeled barrow. A hook member 12 comprises a plate 13 that is pivotally attached at the base of post 11, plate 13 being formed with a hooked end 15. The plate 13 conforms to post 11 and in this regard may be bent around it on two or three sides, but is forwardly open and free to pivot open and away from post 11, or closed against post 11. Plate 13 is defined by a hole near its proximal end for pivoting connection to the rigid post 12 by a pivot pin 14, which passes through the hole. The post 11 preferably has corresponding holes appropriately positioned and aligned to receive the pivot pin 14 and retain the hook member 12 on the pivot pin 14 and in contact with the post 11 at the limit of its pivotal movement. The hook end 15 of hook member 12 is downwardly curved for engaging the second horizontal member of the two wheeled barrow, as shown in FIGS. 3 and 4. Moreover, the hook end 15 is positioned to close over the end of post 11, thereby capturing the second horizontal member of the two wheeled barrow therein. The shaft 13 has an integral handle 17 extending from it in a direction perpendicular to the plane of the shaft 13 for withdrawing the hook member 12. In addition, as shown in FIG. 2 a lug 16 protrudes from the post 11 and passes through a hole in the plate 13 of the hook member 12, and is anchored in post 11. A compression spring 18 is mounted on the lug 16 (outside the hook member 12) in order to provide a bias against the withdrawal of the hook member 12. One skilled in the art will note that a suitable bias could also be achieved by an extension spring mounted on the other side of shaft 13. In either case, by use of handle 17 the user can releasably capture the second horizontal member of the two wheeled barrow by releasing the hook end 15 over the end of post 11.

To deploy the trailer adapter hitch 1 as shown in FIGS. 1–3, the user holds the rigid strut 2 behind the two wheeled barrow and draws the first rod 8 against the compression spring 10 to the extent necessary to unblock the transverse yoke 4. The device is lowered so that the transverse yoke 4 descends onto the axle, axle housing or axle bearings, between the wheels. The first rod 8 is released allowing the compression spring 10 to bear on the collar 9 and thereby urge the first rod 8 across the opening below the axle, retaining the axle within the transverse yoke 4. The user then withdraws the hook member 12 by pulling on handle 17, and raises the device until the end of the post 11 comes in contact with the second horizontal member of the two wheeled barrow. The user releases the handle 17 to lock the hook member 12 around the second horizontal member. The hitch 1 may then be coupled to the tractor for use. The resulting two-point attachment is sturdy and secure, and can be used with the lawn tractor in the standard manner of a tractor pull-cart. Removal is easily accomplished by reversing the steps described for installation and the two wheeled barrow is again ready for use manually.

The trailer adapter hitch 1 as described above is compact and can be stored conveniently in a minimum of space. Moreover, it is economical and turns a barrow into a trailer for a fraction of the cost of the latter.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An adapter hitch for attaching an existing wheel barrow to a motorized vehicle comprising:
   an elongated rigid strut having a hitch at one end for attachment to said motorized vehicle, and a first coupling at another end for central releasable attachment around an axle of said barrow; and
   a post extending upwardly from said strut, said post having a distal second coupling for releasable attachment to a frame of said wheel barrow.

2. The adapter hitch according to claim 1, wherein the first coupling of said strut comprises a first locking mechanism for releasable locking attachment around an axle of said barrow.

3. The adapter hitch according to claim 2, wherein the second coupling of said post comprises a second locking mechanism for releasable locking attachment to the frame of said wheel barrow.

4. The adapter hitch according to claim 3, wherein said first locking mechanism comprises a spring loaded rod slidably inserted across said transverse yoke for blocking an opening of the yoke to retain the axle of said barrow.

5. The adapter hitch according to claim 3, wherein said second locking mechanism comprises an upwardly extending hook member pivotally mounted to said post.

6. The adapter hitch according to claim 5, wherein said upwardly extending hook member includes a hook end that pivots over said post to capture the frame of said wheel barrow therein.

7. The adapter hitch according to claim 6, wherein said second locking mechanism further comprises a bias-spring to maintain the hook member over said post to secure the frame of said wheel barrow therein.

8. The adapter hitch according to claim 7, wherein said second locking mechanism further comprises a handle attached to said hook member for manual withdrawal of the hook member away from said post to release the frame of said wheel barrow.

9. The adapter hitch of claim 7 wherein said upwardly extending hook member is connected to said post by a pivot pin.

10. An adapter hitch for attaching an existing two-wheeled barrow to a motorized vehicle comprising:
    an elongated rigid strut having a hitch at one end for attachment to said motorized vehicle, and having a transverse yoke at the other end for attachment to a horizontal member of said barrow;
    a first locking mechanism mounted on said transverse yoke for removably locking the transverse yoke to the horizontal member of said barrow;
    an upwardly extending hook mounted on said strut for removably locking the strut to a second horizontal member of said barrow, wherein said upwardly extending hook is connected to the rigid strut by a pivot pin, and said second locking mechanism further comprises releasable retaining means.

11. An adapter hitch for attaching an existing two-wheeled barrow to a motorized vehicle comprising:
    an elongated rigid strut having a hitch at one end for attachment to said motorized vehicle, and having a transverse yoke at the other end for attachment to a horizontal member of said barrow;
    a first locking mechanism mounted on said transverse yoke for removably locking the transverse yoke to the horizontal member of said barrow;
    an upwardly extending hook mounted on said strut for removably locking the strut to a second horizontal member of said barrow, wherein said upwardly extending hook is connected to the rigid strut by a pivot pin, and said second locking mechanism further comprises releasable retaining means, wherein said releasable retaining means comprises a rod disposed in aligned holes in the post and the upwardly extending hook, the said rod having means for releasably retaining the hook in contact with the said post.

12. An adapter hitch for attaching an existing two-wheeled barrow to a motorized vehicle comprising:
    an elongated rigid strut having a hitch at one end for attachment to said motorized vehicle, and having a transverse yoke at the other end for attachment to a horizontal member of said barrow;
    a first locking mechanism mounted on said transverse yoke for removably locking the transverse yoke to the horizontal member of said barrow;
    an upwardly extending hook mounted on said strut for removably locking the strut to a second horizontal member of said barrow, wherein said upwardly extending hook is connected to the strut by a pivot pin and the releasable retaining means of said upwardly projecting hook comprises a second rod disposed in aligned holes in a post and the upwardly extending hook, the said second rod having a means for releasably retaining the hook in contact with the said post.

* * * * *